Aug. 4, 1970   MASAO ANDO   3,523,177
METHOD FOR FEEDING ELECTRIC POWER TO HEAT GENERATING
BODIES OF A PLURALITY OF SECTIONS
Filed Aug. 8, 1967

INVENTOR
MASAO ANDO

BY *Craig & Antonelli*

ATTORNEYS

United States Patent Office 3,523,177
Patented Aug. 4, 1970

3,523,177
METHOD FOR FEEDING ELECTRIC POWER TO HEAT GENERATING BODIES OF A PLURALITY OF SECTIONS
Masao Ando, Yokohama-shi, Japan, assignor to Chisso Corporation, Osaka, Japan
Filed Aug. 8, 1967, Ser. No. 659,178
Int. Cl. G05d 24/02
U.S. Cl. 219—300                                         5 Claims

ABSTRACT OF THE DISCLOSURE

A system for feeding power to heat generating bodies composed of a plural number of sections which comprises connecting the electric circuit in the first section nearer to a power source with the primary side of the transformer, the secondary side of which transformer is used for feeding the electricity to the second section in series relationship and effecting the same connection in the third and subsequent sections.

---

This invention relates to a method for supplying electricity to heat generating bodies composed of a plural number of sections.

When a liquid such as heavy oil having a relatively high viscosity at room temperature is to be transported over a long distance, a large power is necessary for pumping the viscous fluid and pipes with large diameter must be used. Accordingly, it is a common practice to heat up the liquid to a temperature in the range of about 40–100° C. to reduce its viscosity prior to pipelining. In order to prevent the heavy oil passing through the pipes from cooling down, various attempts have been proposed e.g. placing oil transportation pipes adjacent steam pipes, hot water pipes or the like, or heating the pipes with electricity i.e. passing electricity directly through the oil transportation pipes, heating the pipes with insulated heat generating conductor line and heating by the use of such heat generating pipes as disclosed in the U.S. Pat. 3,293,407 filed Nov. 7, 1966, U.S. Ser. No. 627,721 filed Apr. 3, 1967, and U.S. Ser. No. 627,086 filed Mar. 30, 1967.

However, the known methods for maintaining the temperature level of the oil transporting pipes have proven disadvantageous for one or more reasons, such as cost and maintenance. Accordingly it is an object of the present invention to provide a method for supplying electricity to heat generating bodies composed of a plural number of sections associated with respective sections of a pipe line situated at distant points from the electric source without the disadvantages encountered heretofore.

This and other objects, features and advantages of the present invention will become more apparent from the following detailed description thereof, when taken with the accompanying drawing, wherein.

Figure 1:
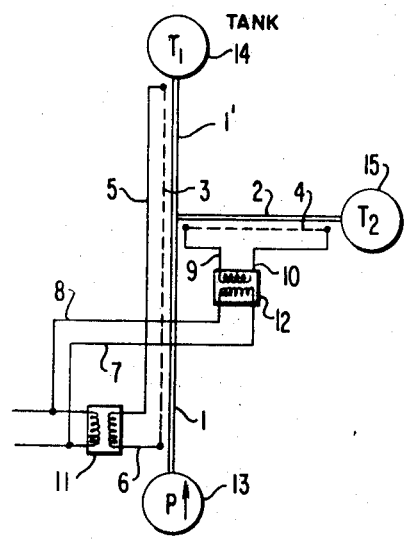
FIGS. 1 and 3 are schematic diagrams illustrating known systems for feeding electricity to heat generating bodies formed in two sections.

Referring to the appended drawing, there are indicated conventional methods for supplying electricity to pipe lines to be heated by electricity. In FIG. 1, 1 is a pipe line which is necessary to be heated. A pipe line 2 which is also necessary to be heated is branched from an intermediate point of the pipe line 1. 3 and 4 are heat generating bodies for heating pipe lines 1 and 2, respectively. Electricity is supplied to be at generating body 3 from a source 11 through wires 5 and 6 and to heat generating body 4 from a source transformer 12 through wires 9 and 10. Source transformer 12 is connected to the common source 11 through wires 7 and 8. 13 is an oil pump for pumping oil to tanks 14 and 15.

Figure 3:
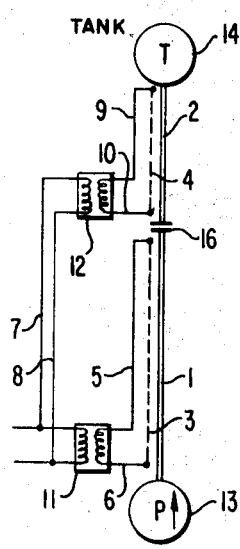

In FIG. 3, the symbols have the same meaning as in FIG. 1 but in this case there is only one tank 14 placed, the tank 15 being omitted. However, there is inserted in the pipe an electric insulation 16 between the pipe line section 1 and the pipeline section 2. An exemplary case requiring such an insulation as 16 is an arrangement where section 1 is buried under the ground and is under cathodic protection and section 2 is a pipe line installed above the ground.

Figure 4:
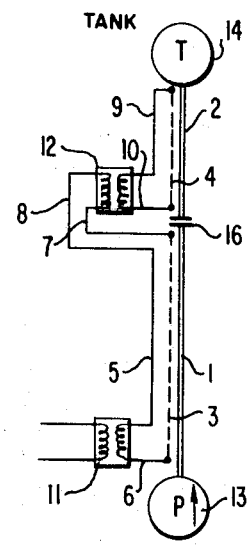

In FIGS. 1 and 3 and 4, the heat generating bodies 3 are different elements from the pipe lines 1 and 2 but when electricity is directly supplied to lines 1 and 2, the terminals of wires 5, 6, 9 and 10 are directly connected to terminals fixed to lines 1 and 2. When a pipe line 1 is extremely long but line 2 is relatively short and connected at the point near 14, the source transformer 12 can be a smaller one compared with 11. Obviously this arrangement is uneconomical because long wires 7 and 8 are necessary for such a small transformer.

According to the present invention, a supply of electricity to heat generating bodies having a plural number of sections is carried out by the arrangement in which with the secondary side of each source transformer for heat generating electricity in each section other than a terminal section remote from an electric source, the primary side of each source transformer is used as a source of heat generating current for the other section with which it is connected in series. Now, referring to FIGS. 2 and 4 there are shown the methods of supplying electricity in accordance with the present invention which correspond to the systems of FIG. 1 and FIG. 3, respectively.

Figure 2:
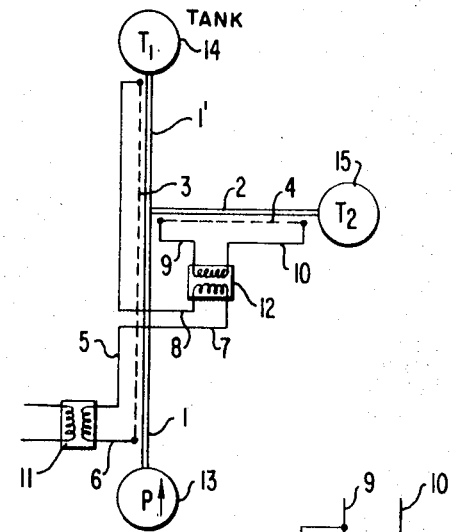
FIGS. 2 and 4 are schematic diagrams of systems in accordance with the invention forming an improvement over the systems of FIGS. 1 and 3, respectively.
Figure 5:
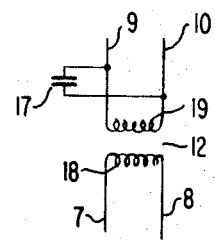
FIG. 5 is a schematic diagram of the circuit connection within one transformer in accordance with the invention.

In FIG. 2, the symbols are the same as in FIG. 1, but the supply of electricity to transformer 12 which is located at a position far from source transformer 11, is different from the case of FIG. 1 in that the primary circuit of transformer 12 i.e. the primary winding 18 of the transformer indicated in FIG. 5 is connected through wires 7 and 8 with the load side circuit 5–3–6 of transformer 11 at a position nearest to transformer 12 so as to provide a series connection.

The relationship between FIGS. 3 and 4 is very much the same with that between FIGS. 1 and 2.

FIG. 5 is a schematic wiring diagram of one example of the source transformer 12 wherein 18 is a primary winding and 19 is a secondary winding connected to the load through wires 9 and 10. It goes without saying that its voltage and current are those suitable to the heat generating body 4 and generally different from the voltage and current necessary for heat generating body 3.

As indicated in FIGS. 2 and 4, the method of the present invention makes it possible to shorten the wires 7 and 8 but it has a disadvantage in that the capacity of transformer 11 must be greater than that of the transformer 11 conventionally used in FIGS. 1 and 3.

However as above-mentioned, when the pipe line 1 is extremely long compared with pipe line 2, it is economical to adopt the present invention because the source wiring of transformer 12 can be shortened affording a great economic advantage.

There is another point of the present system different from the conventional system. In the latter system, transformers 11 and 12 lie in a parallel circuit and hence connection to each can be made and broken independently. Whereas in the former system, transformers 11 and 12 are in series relative to the source, hence connection to them cannot be made and broken independently.

Accordingly when by some reason or other, e.g. by breaking of the wire, the secondary load circuit of transformer 12, 9–4–10 becomes an open circuit, a load current is forced to flow through the primary circuit of transformer 12, via elements 5–7–18–8–5–3–6 and the transformer is exposed to the danger of burning-out due to over-excitation.

In order to avoid such a danger, there is inserted, in accordance with the present invention, a phase advancing condenser 17 at a position in the load side of transformer 12, as shown in FIG. 5 which has a sufficient electric capacity to prevent the burning-out of the transformer 12.

Since condenser 17 is helpful in the improvement of the power factor of the total circuit, the installation of condenser 17 is not economically disadvantageous.

Although the foregoing explanation is given for the case of two pipe sections i.e. that a heat-generating body is composed of two pipe sections, the relation is just the same in case a heat-generating body is composed of a plural number (more than two) of sections. For example when a new section is added to the pipe line a primary winding of a new transformer for this new section is connected with the secondary circuit of the transformer 12 in series relationship.

What is claimed is:

1. A system for supplying electrical energy from a single source to at least first and second heat generating bodies, at least said second heat generating body being located at a substantial distance from said source comprising
   a first transformer having a primary winding connected to said source and a secondary winding connected to said first heat generating body, and
   a second transformer having a primary winding connected in series with said first heat generating body across the secondary winding of said first transformer at a point adjacent said second heat generating body and a secondary winding connected across said second heat generating body, so that energizing current for said second heat generating body is derived from the circuit of said first heat generating body.

2. A system as defined in claim 1, wherein a condenser is connected in parallel with the secondary winding of each of said first and second transformers, respectively.

3. A system as defined in claim 1, comprising a plurality of additional heat generating bodies located at a distance from said source and an equal number of additional transformers each having a secondary winding connected across one of said additional heat generating bodies and a primary winding connected in series with another one of said second and additional heat generating bodies.

4. In an apparatus for transporting liquid while maintaining it at an elevated temperature including a liquid transporting pipe having first and second sections, a system for maintaining said first and second sections at an elevated temperature comprising,
   first and second heat generating bodies positioned in heat transfer relationship with said first and second sections, respectively,
   an electrical energy source located in the vicinity of said first section and at a distance from said second section,
   a first transformer having a primary winding connected to said source and a secondary winding connected across said first heat generating body, and
   a second transformer having a primary winding connected in series with said first heat generating body across the secondary winding of said first transformer at a point in the vicinity of said second heat generating body and a secondary winding connected across said second heat generating body, so that the energizing current for said second heat generating body is derived from the circuit of said first heat generating body.

5. The combination defined in claim 4, wherein a condenser is connected in parallel with the secondary winding of each of said first and second transformers, respectively.

References Cited

UNITED STATES PATENTS

| | | | |
|---|---|---|---|
| 2,224,403 | 12/1940 | Lines | 219—300 |
| 2,619,576 | 11/1952 | Greibach | 219—240 |
| 3,293,407 | 12/1966 | Ando | 219—301 |

FOREIGN PATENTS

| | | |
|---|---|---|
| 504,506 | 4/1939 | Great Britain. |
| 609,391 | 9/1948 | Great Britain. |

BERNARD GILHEANY, Primary Examiner

F. E. BELL, Assistant Examiner

U.S. Cl. X.R.

219—483